under 35 U.S.C. 154(b) by 299 days.

(12) United States Patent
Hu et al.

(10) Patent No.: US 11,631,192 B2
(45) Date of Patent: Apr. 18, 2023

(54) ROBOT CLIMBING CONTROL METHOD AND DEVICE AND STORAGE MEDIUM AND ROBOT

(71) Applicant: UBTECH ROBOTICS CORP LTD, Shenzhen (CN)

(72) Inventors: Shuping Hu, Shenzhen (CN); Jun Cheng, Shenzhen (CN); Jingtao Zhang, Shenzhen (CN); Miaochen Guo, Shenzhen (CN); Dong Wang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 299 days.

(21) Appl. No.: 17/107,860

(22) Filed: Nov. 30, 2020

(65) Prior Publication Data

US 2021/0166416 A1 Jun. 3, 2021

(30) Foreign Application Priority Data

Nov. 29, 2019 (CN) .......................... 201911198984.8

(51) Int. Cl.
*G06T 7/73* (2017.01)
*G06T 7/12* (2017.01)
(Continued)

(52) U.S. Cl.
CPC .............. *G06T 7/73* (2017.01); *B25J 9/1664* (2013.01); *B25J 9/1679* (2013.01); *B25J 9/1697* (2013.01); *G06T 7/12* (2017.01); *G06T 7/50* (2017.01); *G06T 2207/10052* (2013.01); *G06T 2207/20024* (2013.01)

(58) Field of Classification Search
CPC .. G05D 1/0212; G05D 1/0231; G05D 1/0246; G06T 7/73; G06T 1/0014; G06T 7/13; G06T 7/10; G06T 7/12; G06T 7/50; G06T 2207/10052; G06T 2207/20024; G06T 2207/10024; G06T 2207/10028; G06T 2207/30244; G06T 2207/30261;
(Continued)

(56) References Cited

U.S. PATENT DOCUMENTS

2018/0005054 A1* 1/2018 Yu ........................... G06V 10/48
2018/0224275 A1* 8/2018 Kinoshita ............... G06T 7/521
(Continued)

FOREIGN PATENT DOCUMENTS

CN 104331884 A 2/2015

*Primary Examiner* — Bobbak Safaipour
*Assistant Examiner* — Benedict E Lee

(57) ABSTRACT

A robot climbing control method is disclosed. The method obtains an RGB color image and a depth image of stairs, extracts an outline of a target object of a target step on the stairs from the RGB color image, determines relative position information of the robot and the target step according to the depth image and the outline of the target object, and controls the robot to climb the target step according to the relative position information. The embodiment of the present disclosure allows the robot to effectively adjust postures and forward directions on any size of and non-standardized stairs and avoids the deviation of the walking direction, thereby improving the effectiveness and safety of the stair climbing of the robot.

20 Claims, 12 Drawing Sheets

(51) Int. Cl.
*G06T 7/50* (2017.01)
*B25J 9/16* (2006.01)

(58) Field of Classification Search
CPC ...... B62D 57/02; B62D 57/024; B25J 9/1664;
B25J 9/1679; B25J 9/1697; B25J 13/00
See application file for complete search history.

(56) References Cited

U.S. PATENT DOCUMENTS

2020/0324412 A1\* 10/2020 Whitman ............. G05D 1/0891
2021/0146548 A1\* 5/2021 Blankespoor .......... B25J 9/1692
2021/0189171 A1\* 6/2021 Wang ................... C08G 18/307
2021/0334574 A1\* 10/2021 Zhang ...................... G06T 7/13

\* cited by examiner

ROBOT CLIMBING CONTROL METHOD AND DEVICE AND STORAGE MEDIUM AND ROBOT

CROSS REFERENCE TO RELATED APPLICATIONS

This application claims priority to Chinese Patent Application No. 201911198984.8, filed Nov. 29, 2019, which is hereby incorporated by reference herein in its entirety.

BACKGROUND

1. Technical Field

The present disclosure relates to an image processing technical field, and more particularly to a robot climbing control method, device, storage medium and robot.

2. Description of Related Art

As served as an automated machine, a humanoid robot is required to be equipped with some intelligent abilities like humans or creatures. However, maneuver abilities of a robot greatly limit activity ranges of the robot that the most important one is stair climbing.

At present, related research and manufacturing of the climbing stairs of the robot is still in its infancy. Most of the research is limited to the development of the stair climbing of a wheeled robot. For the wheeled robot, the posture of the robot in the process of the stair climbing is relatively stable and tends to be unchanged, so it only needs to locate the stairs before climbing up the first stair. For the humanoid robot, although it can only locate the stairs before climbing up the first stair, and, however, under this scheme, a higher standardization degree for the stairs is a standard option for the humanoid robot. Accordingly, when the height of the stairs in front of the robot are inconsistent or turns around, mobile safety of the robot may be affected.

DETAILED DESCRIPTION

To clarify the purpose, technical solutions, and the advantages of the disclosure, embodiments of the invention will now be described more fully hereinafter with reference to the accompanying drawings, in which embodiments of the invention are shown.

As used herein, the term "main control process" refers to a computer-implemented process/method for a physical component. The main control process may be a sub-process, in one example.

An embodiment of a camera is applied to a smart robot, specifically applied to stair climbing of the smart robot.

Figure 1:
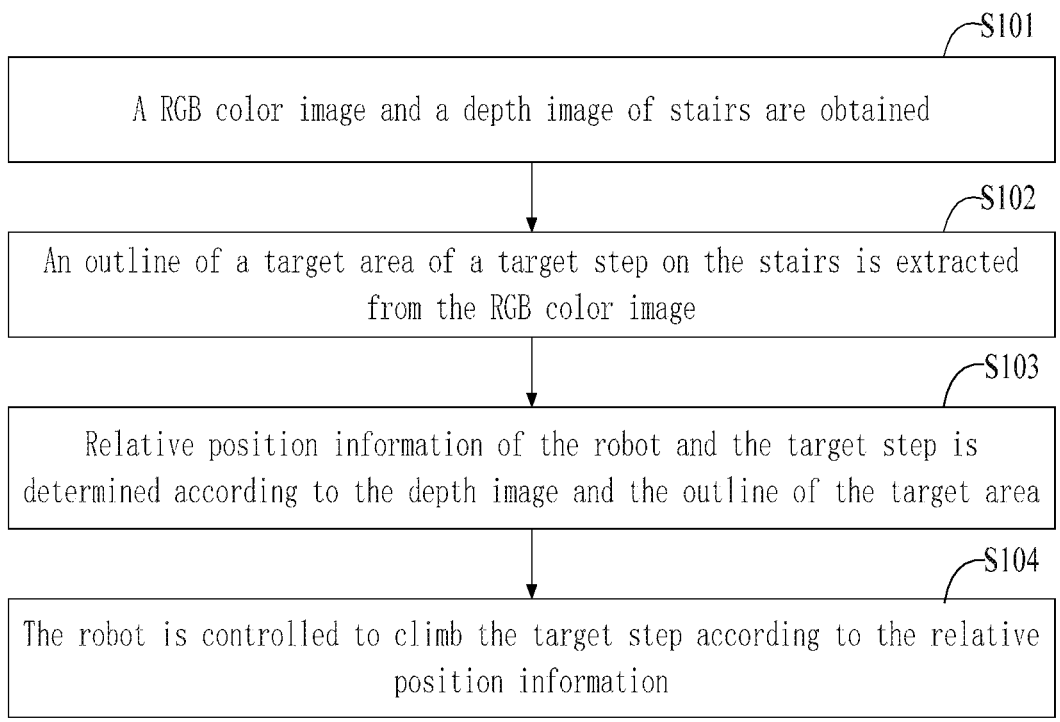
FIG. 1 is a flowchart of a robot climbing control method in accordance with an embodiment of the present disclosure.

FIG. 1 is a flowchart of a robot climbing control method in accordance with an embodiment of the present disclosure, comprising steps S101 to S104. Specific implementations of each step are described as follows:

Step S101: an RGB color image and a depth image of stairs are obtained.

In this embodiment of the present disclosure, an execution end refers to a robot. Specifically, the robot is a humanoid robot, which may stably behave in standing with one foot, turning and moving horizontally. The robot is equipped with an RGBD camera for real-time shooting of RGB color images and depth images.

Step S102: an outline of a target object on a target step on the stairs is extracted from the RGB color image.

Figure 1A:
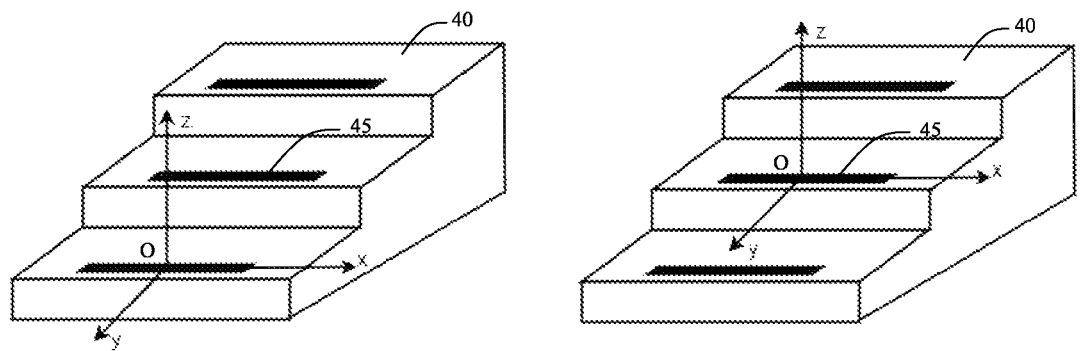
FIG. 1a is a schematic view of the stairs in accordance with an embodiment of the present disclosure.

Specifically, FIG. 1a shows the outline of the target object on the target step on the stairs 40. The target step refers to the step to be climbed by the robot, and the target object can be an anti-skid belt 45 on the target step. The target object can also be another object or pattern on the target step. The outline of the object or pattern has depth information along the depth direction of the target step.

Figure 2:
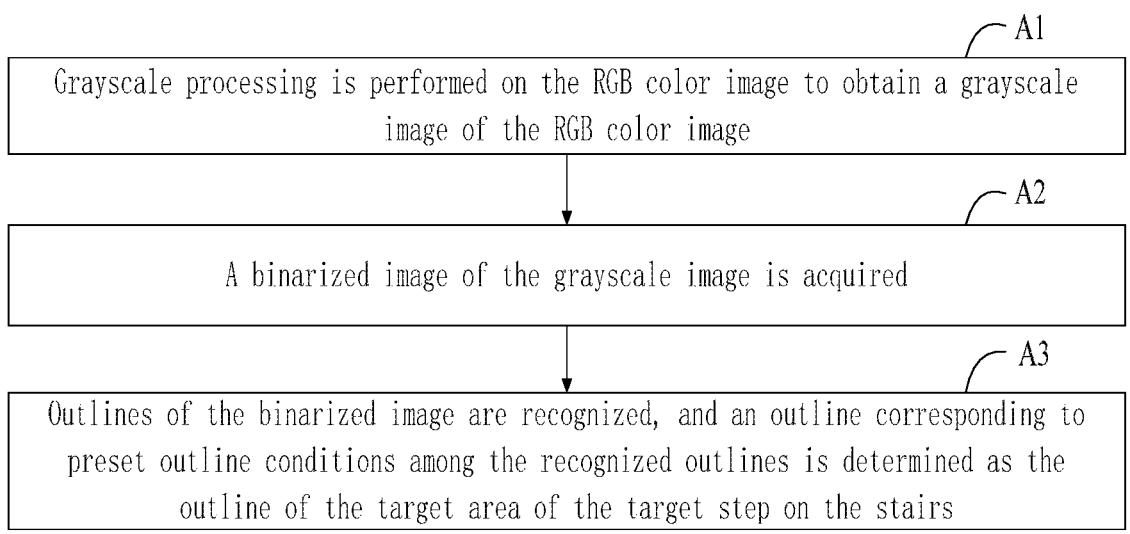
FIG. 2 is a flowchart of step S101 of the robot climbing control method of the robot in accordance with an embodiment of the present disclosure.

As an embodiment of the present disclosure, FIG. 2 is a specific flowchart of step S101 of the robot climbing control method of the robot, which is described as follow:

A1: grayscale processing is performed on the RGB color image to obtain a grayscale image of the RGB color image. Specifically, the grayscale means that, in an RGB model, if R=G=B, the color represents a grayscale color. The value of R=G=B is called the grayscale value. Therefore, in the grayscale image, a grayscale value of each grayscale image can be stored using only one byte. The grayscale processing methods at least include a component method, a maximum value method, an average method and a weighted average method. In this embodiment, any one of the above grayscale processing methods can be implemented to the RGB color image to obtain a grayscale image of the RGB color image.

A2: a binarized image of the grayscale image is acquired. Specifically, the grayscale image is processed using a preset image segmentation algorithm to obtain a binarized image of the grayscale image. The image segmentation refers to dividing an image into several disjoint areas based on features such as grayscales, colors, spatial textures, and geometric shapes. These features show consistency or similarity in the same area but show significant difference between different areas. In this embodiment, the target step in the grayscale image are separated from the background. Exemplarily, the grayscale image is processed according to dynamic threshold segmentation to obtain a binarized image of the grayscale image.

A3: outlines of the binarized image are recognized, and an outline corresponding to preset outline conditions among the recognized outlines is determined as the outline of the target object on the target step on the stairs.

Figure 3:
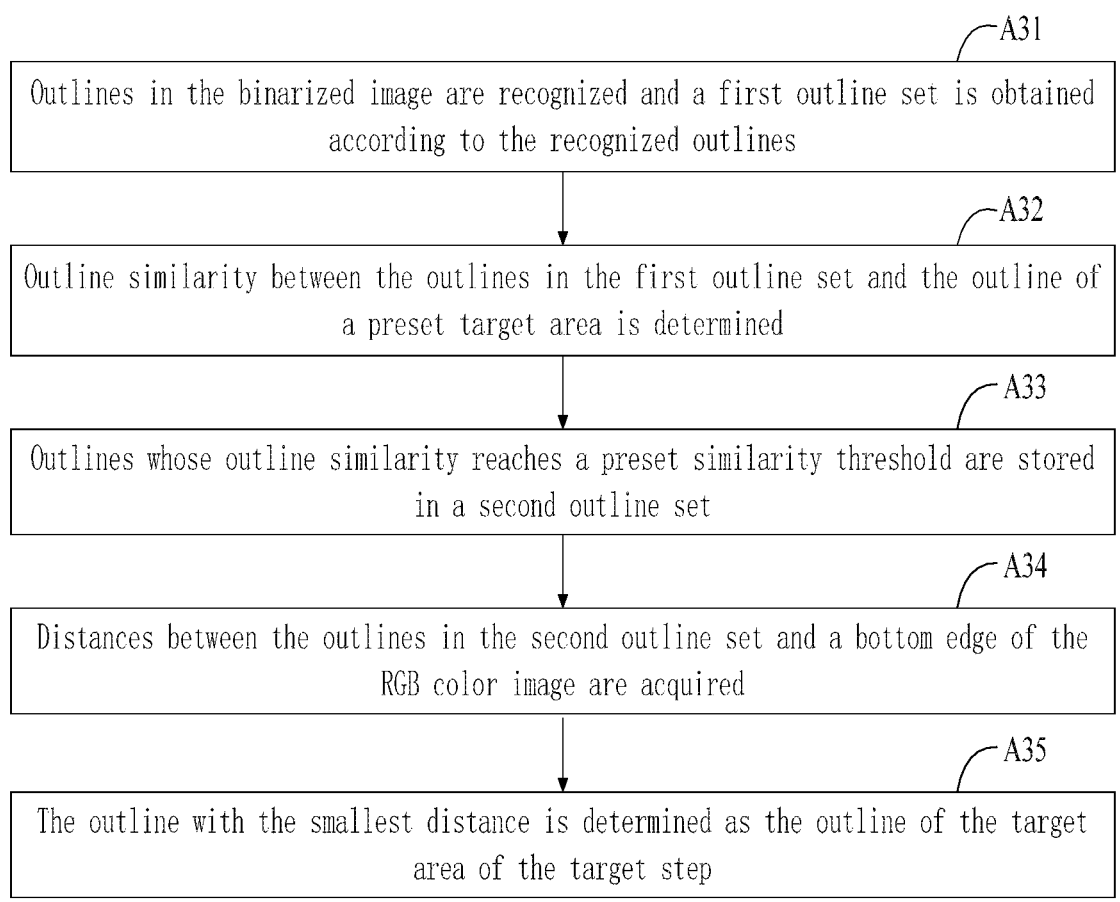
FIG. 3 is a flowchart of identifying an outline of a target object on a target step in accordance with an embodiment of the present disclosure.

Optionally, as shown in FIG. 3, the step A3 specifically comprises:

A31: outlines in the binarized image are recognized and a first outline set is obtained according to the recognized outlines. Specifically, the outline of the target object is a black rectangular bar. The outlines in the binarized image are detected, and the detected black rectangular outlines are stored in the first outline set.

A32: outline similarity between the outlines in the first outline set and the outline of a preset target object is determined. In this embodiment, the outline of the preset target object is a black rectangular outline, and the outline of the preset target object includes a predefined size interval. The outline similarity of the outline in the first outline set and the outline of the preset target object is traversed and calculated to determine the outline of the target object on the target step.

A33: outlines whose outline similarity reaches a preset similarity threshold are stored in a second outline set. The detected outlines are preliminarily screened according to the outline similarity, and the interfered black rectangle information is eliminated, thereby improving accuracy of the outline detection of the target object.

A34: distances between the outlines in the second outline set and a bottom edge of the RGB color image are acquired. Specifically, the certain point of each outline in the second outline set is determined, and the distances between the center of each outline and the bottom edge of the RGB color image is calculated respectively.

A35: the outline with the smallest distance is determined as the outline of the target object on the target step.

In this embodiment, there may be more than one step in the RGB image acquired by the robot, and more than one outlines of the target object may also be detected. The closest distance to the bottom edge of the RGB color image is regarded as the closest distance to the robot. The distances between the outline in the second outline set and the bottom edge of the RGB color image are calculated, and then the outlines in the second outline set are sorted according to the distances to the bottom edge from small to large. Regarding the second outline set, the outline with the smallest distance to the bottom edge is determined as the outline of the target object on the target step.

Optionally, in this embodiment, before outline recognition is performed, the image obtained by the image segmentation algorithm, such as the dynamic threshold algorithm, is refined using a thinning algorithm to obtain a thinned image. The outline detection is performed to the thinned image to enable the outline recognition to be more accurate and effective.

When a climbing control program has been just started and the robot has not reached the stairs, the robot must locate the stairs and determine the position of the stairs. As an embodiment of the present disclosure, before the step of extracting the outline of the target object on the target step on the stairs from the RGB color image, the stairs in the RGB color image are located using a preset positioning algorithm. An area of the RGB color image where the stairs are resided is determined as a region of interest (ROI) according to the positioning result of the stairs. An outline corresponding to a preset outline condition is extracted from the region of interest using the determining step to the outline of the target object, and the extracted outline is determined as the outline of the target object on the target step on the stairs.

Specifically, the Histogram of Oriented Gradient (HOG)+ Support Vector Machine (SVM) algorithm is used to locate a location area of the stairs in the above RGB color image, and then the outline of the target step on the stairs is determined based on the location area.

In the embodiment of the present application, rough positioning of the stairs is performed using the SVM+HOG algorithm. The rough position of the stairs is located in the entire space, and the result of the rough positioning is set as the ROI. Specifically, the rough positioning through the SVM+HOG algorithm includes a training phase and a rough positioning phase, where the above training phase includes:

a): a lot of images of the stairs are collected from different angles as positive sample files, and some images which do not contain the stairs are collected as negative sample files;

b): images containing the stairs are cropped so that only the stairs are included in the positive sample files;

c): all of the positive sample files and the negative sample files are scaled to the same size, and are stored in different folders;

d): the HOG features of all the positive and negative sample files are extracted, the positive sample files are assigned with label 1, the negative sample files are assigned with label 0, and, suppose the HOG feature of the sample files is $V_r$, the label is $S_r$, $r \in [1, R]$, and R represents the total number of the sample files;

e): the HOG features of the positive and negative sample files are trained using the SVM, so that the positive and negative sample files can be correctly classified, and a classifier is obtained and optimized to obtain the optimized SVM+HOG classifier.

The rough positioning phase comprises the following steps:

f): RGB color images and HOG features are input;

g): it is determined whether there are stairs in the RGB color image using the SVM+HOG classifier, and, if so, the area having the stairs in the RGB color image are obtained and is set as an ROI.

Optionally, if any one of outlines of the target object corresponding to the preset outline condition cannot be extracted from the ROI, the ROI is switched to the entire RGB color image. In one situation, when any one of outlines of the target object corresponding to the preset outline condition cannot be discovered in the ROI, and the ROI is not the entire image or the robot does not work in the state before climbing on the first step, it is indicated that the target step is not the first step, which means that the robot has climbed on the next step. The ROI needs to be set to the entire RGB color image and the Kalman filter is reinitialized. In another situation, when any one of outlines of the target object corresponding to the preset outline condition cannot be discovered in the ROI, and the ROI is the entire image or the robot works in the state before climbing on the first step, it is stated that the currently obtained RGB color image does not contain target object information, and it directly starts to obtain the next frame of the RGB color image and the depth image.

Optionally, in the embodiment of the present disclosure, if the robot has already started to climb up the stairs, the image within a set range around the outline of the target object on the previous step is determined as a new ROI. An outline corresponding to the preset outline condition is extracted from the new ROI and the extracted outline is determined as the outline of the target object on the new target step in the stairs. For example, when the robot has climbed up the first step, the target step refers to the second step, the ROI is set to recognize an image within a set range around the outline of the target object on the first step.

In the embodiment of the present disclosure, the stairs is positioned by the rough positioning algorithm, the ROI is set according to the rough positioning result, and then the outline of the target region of the target step on the stairs is extracted from the ROI, which enabling the outline extraction to be more accurate and effective.

Step S103: relative position information of the robot and the target step is determined according to the depth image and the outline of the target object.

Specifically, the relative position of the robot and the target step is the relative position of the robot and the target object on the target step. The relative position of the target object includes distances and angles.

Figure 4:
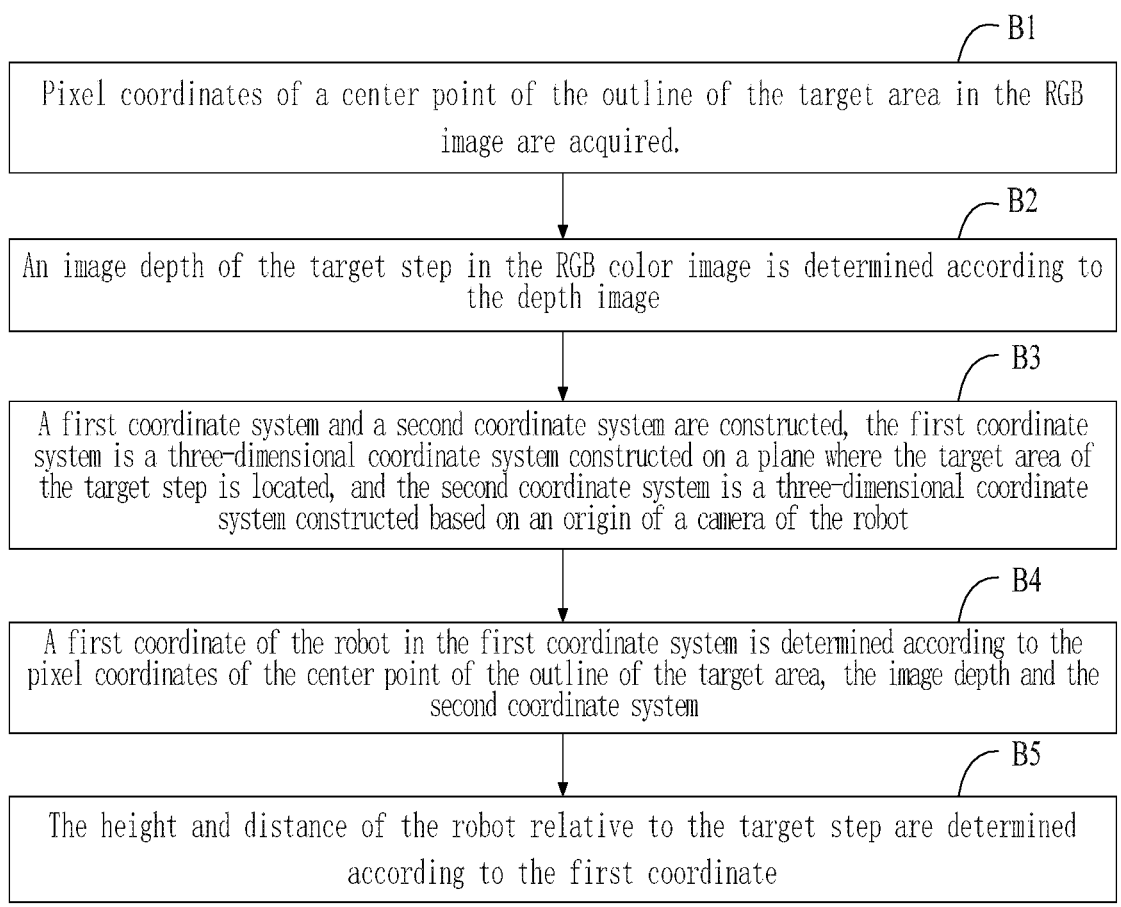
FIG. 4 is a flowchart of step S103 of the robot climbing control method of the robot in accordance with an embodiment of the present disclosure.

As an embodiment of the present disclosure, the camera of the robot is rigidly mounted on the waist of the robot. The position information includes the height and distance of the robot relative to the target step. FIG. 4 is a flowchart of step S103 of the robot climbing control method of the robot in accordance with an embodiment of the present disclosure, which is detailed as follows:

B1: pixel coordinates of a certain point of the outline of the target object in the RGB image are acquired. The certain point may be the certain point of the anti-skid belt 45 in a preferred embodiment. The image is composed of pixels, and the pixel coordinates are the positions of the pixels in the image, which also refers to the coordinates of the pixels at the certain point of the outline of the target object in the image coordinate system of the RGB image.

B2: an image depth of the target step in the RGB color image is determined according to the depth image.

B3: a first coordinate system and a second coordinate system are constructed. The first coordinate system is a three-dimensional coordinate system constructed on a plane where the target object on the target step is located. The second coordinate system is a three-dimensional coordinate system constructed based on an origin of a camera of the robot. For example, the first coordinate system is a stair coordinate system constructed on a plane where the anti-skid belt 45 of the target step of the stair 40 is located, while the second coordinate system is a camera coordinate system.

Figure 5:
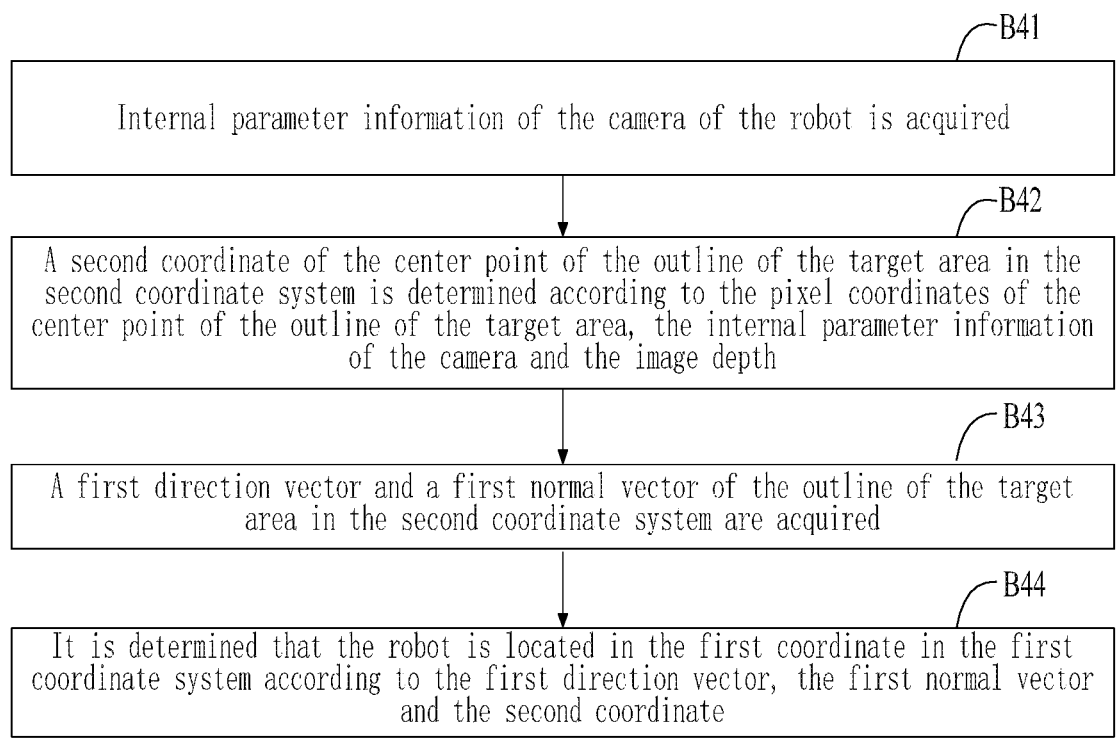
FIG. 5 is a flowchart of determining a first coordinate of the robot in the stair coordinate system in accordance with an embodiment of the present disclosure.

B4: a first coordinate of the robot in the first coordinate system is determined according to the pixel coordinates of the certain point of the outline of the target object, the image depth and the second coordinate system. Optionally, as shown in FIG. 5, the step B4 further specifically comprises:

B41: internal parameter information of the camera of the robot is acquired. The internal parameter information comprises focuses.

B42: a second coordinate of the certain point of the outline of the target object in the second coordinate system is determined according to the pixel coordinates of the certain point of the outline of the target object, the internal parameter information of the camera and the image depth. Specifically, x' is the coordinate axis in the first direction on the second coordinate system, y' is the coordinate axis in the second direction on the second coordinate system, and z' is the coordinate axis in the third direction in the second coordinate system, $O_1'$ is the second coordinate of the certain point of the outline of the target object in the second coordinate system, and p is the pixel coordinate of the certain point of the outline of the target object. The image depth is determined as the value of the coordinate axis z' in the third direction of the certain point of the outline of the target object in the second coordinate system. By using a preset coordinate algorithm, according to the pixel coordinate p of the certain point of the outline of the target object and the image depth, the value of the coordinate axis x' of the certain point of the outline of the target object in the first direction on the second coordinate system and the coordinate axis y' of the certain point of the outline of the target object in the second direction on the second coordinate system are respectively determined.

B43: a first direction vector and a first normal vector of the outline of the target object in the second coordinate system are acquired. In the embodiment, the first direction vector refers to the lateral direction of the anti-skid belt, i.e. the x direction of the first coordinate system. The calculation of the first normal vector and the first direction vector can be referred to existing direction vector methods and existing normal vector methods, which will not be repeated here.

B44: determining the first coordinate of the robot in the first coordinate system according to the first direction vector, the first normal vector and the second coordinate. Specifically, the first coordinate $O_1(x, y, z)$ of the robot in the first coordinate system is determined according to the following formulas (1), (2) and (3):

$$x = \frac{l \cdot O_1'}{l}, \tag{1}$$

$$z = \frac{n \cdot O_1'}{\|n\|}, \tag{2}$$

$$y = \sqrt{O_1' - x^2 - z^2}. \tag{3}$$

x is the coordinate axis in a first direction in the first coordinate system, y is the coordinate axis in a second direction in the first coordinate system, z is the coordinate axis in a third direction in the first coordinate system, '$O_1$ is the second coordinate of the certain point of the outline of the target object in the second coordinate system, l is the first direction vector of the outline of the target object in the second coordinate system, and n is the first normal vector of the outline of the target object in the second coordinate system.

B5: the height and distance of the robot relative to the target step are determined according to the first coordinate. Specifically, the distance includes a span distance and an offset distance. The span distance refers to the linear distance between the robot and the target step. The offset distance refers to the deviation distance of the robot from the certain point of the target step. For example, the offset distance is determined according to the value of x, the span distance is determined according to the value of y, and the height of the robot relative to the target step is determined according to the value of z.

In the embodiment of the present disclosure, referring to the stair coordinate system constructed on the plane where the target object on the target step is located and the camera coordinate system constructed according to the camera of the robot as the origin, the coordinates of the certain point of the outline of the target object extracted from the RGB color image in the camera coordinate system is first calculated. Combined with the direction vector and the normal vector of the outline of the target object in the camera coordinate system, the coordinates of the robot in the stair coordinate system are calculated. The distance of the robot relative to the target step on the stairs is then determined according to the coordinates in the stair coordinate system. The target step and the outline of the target object on the target step is determined in real time to make the determination of the distance of the robot relative to the target step on the stairs more accurate and effective. Thus, the robot can adjust its advancement distance in real time to improve security of the stair climbing.

Figure 4A:
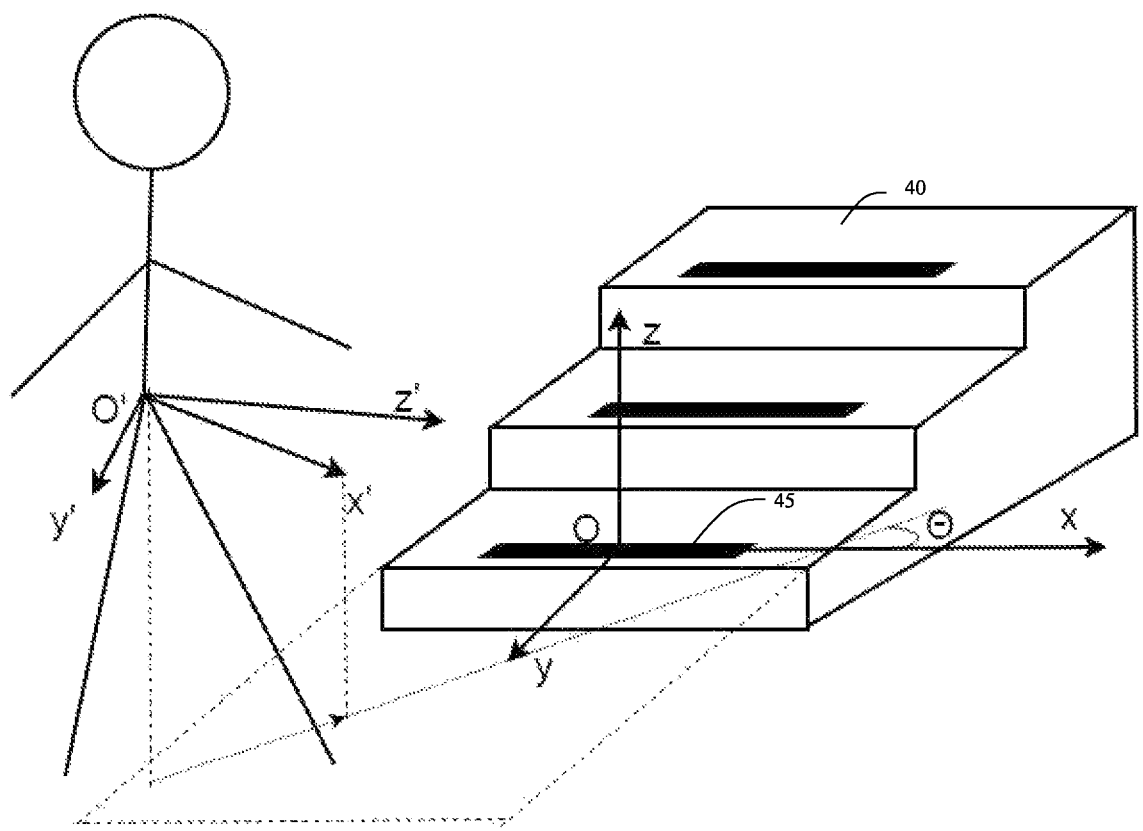
FIG. 4a is a schematic view of a camera coordinate system and a stair coordinate system in accordance with an embodiment of the present disclosure.
Figure 6:
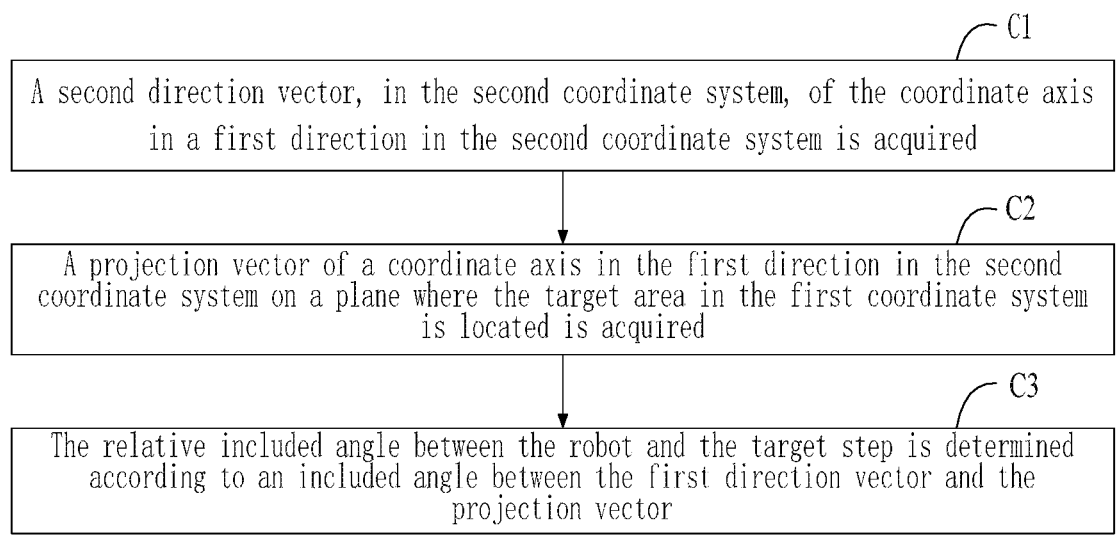
FIG. 6 is a flowchart of step S103 of the robot climbing control method of the robot in accordance with another embodiment of the present disclosure.

As an embodiment of the present disclosure, the relative position information comprises a relative included angle between the robot and the target step. FIG. 6 is a flowchart of step S103 of the robot climbing control method of the robot in accordance with another embodiment of the present disclosure, which is detailed as follows:

C1: a second direction vector, in the second coordinate system, of the coordinate axis in a first direction in the second coordinate system is acquired. Exemplarily, as shown in FIG. 4a, the coordinate axis of the first direction in the second coordinate system is the x' axis in the camera coordinate system.

C2: a projection vector of a coordinate axis in the first direction in the second coordinate system on a plane where the target object in the first coordinate system is located is acquired. Exemplarily, the x' axis in the camera coordinate system is projected to the plane where the target object is located in the stair coordinate system, that is, the xy plane under the stair coordinate system, to obtain the projection vector of the x' axis. Specifically, the projection vector is determined according to the first normal vector and the second direction vector of the outline of the target object in the second coordinate system. The calculation of the projection vector can refer to existing calculation methods.

C3: the relative included angle between the robot and the target step is determined according to an included angle between the first direction vector and the projection vector. The orientation of the robot relative to the stairs can be determined based on the relative included angle.

Specifically, the second direction vector L, $L=[1\ 0\ 0]^T$, is defined, and the projection vector is determined according to the following formula (4):

$$d = L - \frac{L \cdot n}{\|n\|}, \quad (4)$$

where n is the first normal vector of the outline of the target object in the second coordinate system; and the relative included angle θ between the robot and the target step is then determined according to the following formula (5):

$$\cos(\theta) = \frac{d \cdot l}{\|d\| \cdot \|l\|}, \quad (5)$$

wherein l is the first direction vector of the outline of the target object in the second coordinate system.

In this embodiment of the present disclosure, smooth processing is performed to the direction and coordinates of the robot relative to the stair coordinate system using Kalman filtering. When the robot starts to move to the next target step, it is normal that the jump occurs to the direction and coordinates of the robot relative to the staircase coordinate system. At this time, the robot must be reinitialized using the Kalman filtering.

As an embodiment of the present disclosure, in the step of extracting the outline of the target object on the target step on the stairs from the RGB color image, the recognized contour may not be the outline of the target object on the target step due to interference or shadows. In the embodiment of the present disclosure, the value on the coordinate axis in the third direction in the first coordinate, that is, the z value, is determined as the height difference between the certain point of the outline of the recognized outline and the robot. The value of a neighbor point of the certain point of the outline on the coordinate axis in the third direction of the first coordinate system is calculated, which determines the height difference between the neighbor point and the robot. Specifically, the pixel coordinates of the certain point of the outline are defined as (a, b), and the pixel coordinates of the neighbor point is defined as (a, b+2×c), where c is the height of the outline. If the difference between the height difference of the neighbor point and the height difference of the certain point of the outline of the target object is within a preset difference range, the outline is determined as the outline of the target object, and the first coordinates and the relative included angle are calculated and output. If the difference between the height difference of the neighbor point and the height difference of the certain point of the outline of the target object exceeds the preset difference range, it is determined that the outline is not the outline of the target object, and the outline of the target object is re-recognized.

Step S104: the robot is controlled to climb the target step according to the relative position information.

Specifically, the relative position information includes the height and distance of the robot relative to the target step and the relative included angle between the robot and the target step. The height and distance of the robot relative to the target step are determined through the coordinates of the robot in the stair coordinate system. The relative included angle between the robot and the target step is determined according to the included angle between the first direction vector of the robot in the camera coordinate system and the projection vector of the X axis of the camera coordinate system in the stair coordinate system. In the embodiment of the present disclosure, in the process of the stair climbing of the humanoid robot, the height and the span distance of the current target step relative to the robot are estimated in real time to determine the height and span of the robot's next foot lift. In order to prevent the robot from being too far away from the center of the stairs to affect the movement safety of the robot, the offset distance of the robot relative to the center of the target step is estimated in real time to dynamically adjust the position of the robot. At the same time, the included angle of the robot relative to the target step on the stairs is estimated in real time to preserve the rationality of the robot's movement.

In an embodiment of the present disclosure, an RGB color image and a depth image of stairs are obtained, an outline of a target object on a target step on the stairs is extracted from the RGB color image, relative position information of the robot and the target step is determined according to the depth image and the outline of the target object, and the robot is controlled to climb the target step according to the relative position information. The embodiment of the present disclosure allows the robot to effectively adjust postures and forward directions on any size of and non-standardized stairs and avoids the deviation of the walking direction, thereby improving the effectiveness and safety of the stair climbing of the robot.

It should be understood that the size of the sequence number of each step in the foregoing embodiments does not mean the execution sequences. The execution sequences of each process should be determined by its function and internal logic, and should not constitute any limitation on the implementation processes of the embodiments of the present disclosure.

Figure 7:
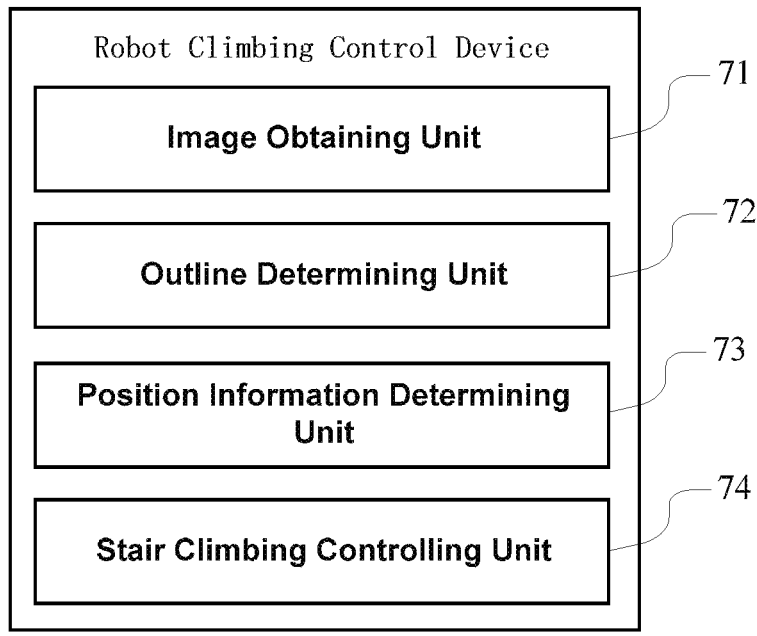
FIG. 7 is a block diagram of functional blocks of a robot climbing control device in accordance with an embodiment of the present disclosure.

Corresponding to the embodiment of the robot climbing control method, FIG. 7 shows a block diagram of functional blocks of a robot climbing control device in accordance with an embodiment of the present disclosure. For the convenience of description, only the parts related to the embodiments of the present disclosure are shown. In addition, the robot climbing control device may also be implemented as a robot climbing control system by software or hardware.

Referring to FIG. 7, the robot climbing control device comprises an image obtaining unit 71, an outline determining unit 72, a position information determining unit 73 and a stair climbing controlling unit 74.

The image obtaining unit 71 is configured to obtain an RGB color image and a depth image of stairs.

The outline determining unit 72 is configured to extract an outline of a target object on a target step on the stairs from the RGB color image.

The position information determining unit 73 is configured to determine relative position information of the robot and the target step according to the depth image and the outline of the target object.

The stair climbing controlling unit 74 is configured to control the robot to climb the target step according to the relative position information.

Figure 7A:
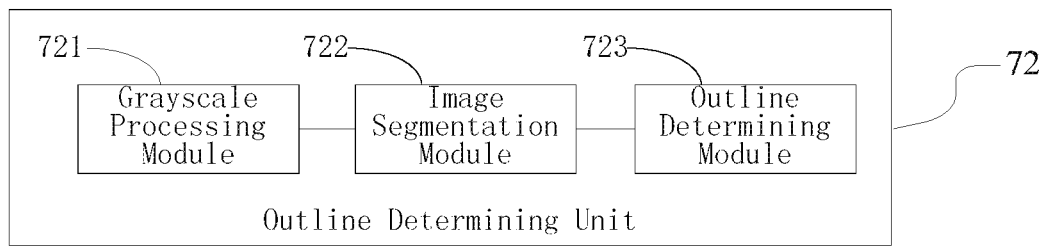
FIG. 7a is a block diagram of functional blocks of an outline determining unit in accordance with an embodiment of the present disclosure.

Optionally, as shown in FIG. 7a, the outline determining unit 72 comprises:

A grayscale processing module 721, configured to perform grayscale processing on the RGB color image to obtain a grayscale image of the RGB color image.

An image segmentation module 722, configured to acquire a binarized image of the grayscale image.

An outline determining module 723, configured to recognize outlines of the binarized image, and determine an outline corresponding to preset outline conditions among the recognized outlines as the outline of the target object on the target step on the stairs.

Figure 7B:
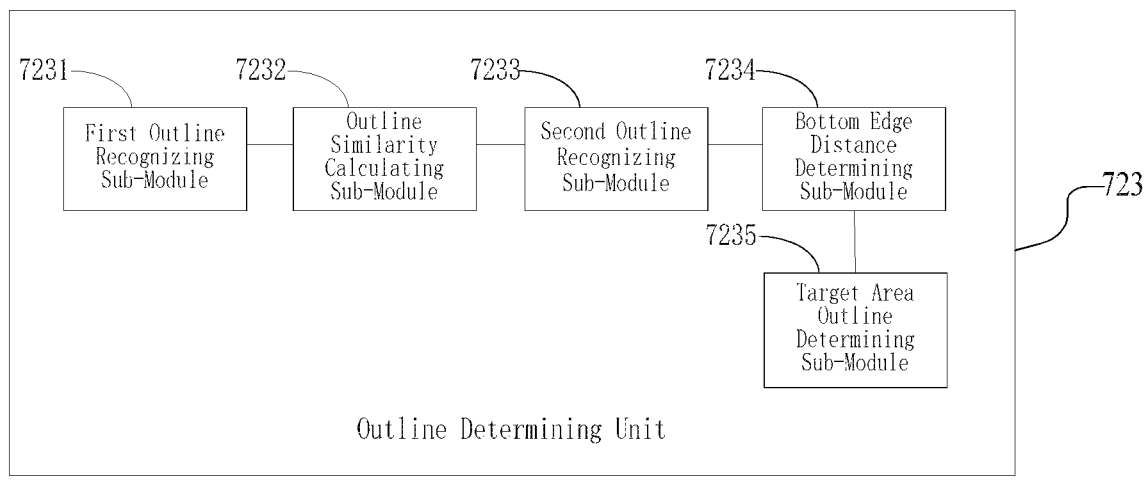
FIG. 7b is a block diagram of functional blocks of an outline determining module in accordance with an embodiment of the present disclosure.

Optionally, as shown in FIG. 7b, the outline determining module 723 comprises:

A first outline recognizing sub-module 7231, configured to recognize outlines in the binarized image and obtain a first outline set according to the recognized outlines.

An outline similarity calculating sub-module 7232, configured to determine outline similarity between the outlines in the first outline set and the outline of a preset target object.

A second outline recognizing sub-module 7233, configured to store outlines whose outline similarity reaches a preset similarity threshold in a second outline set.

A bottom edge distance determining sub-module 7234, configured to acquire distances between the outlines in the second outline set and a bottom edge of the RGB color image.

A target object outline determining sub-module 7235, configured to determine the outline with the smallest distance as the outline of the target object on the target step.

Figure 7C:
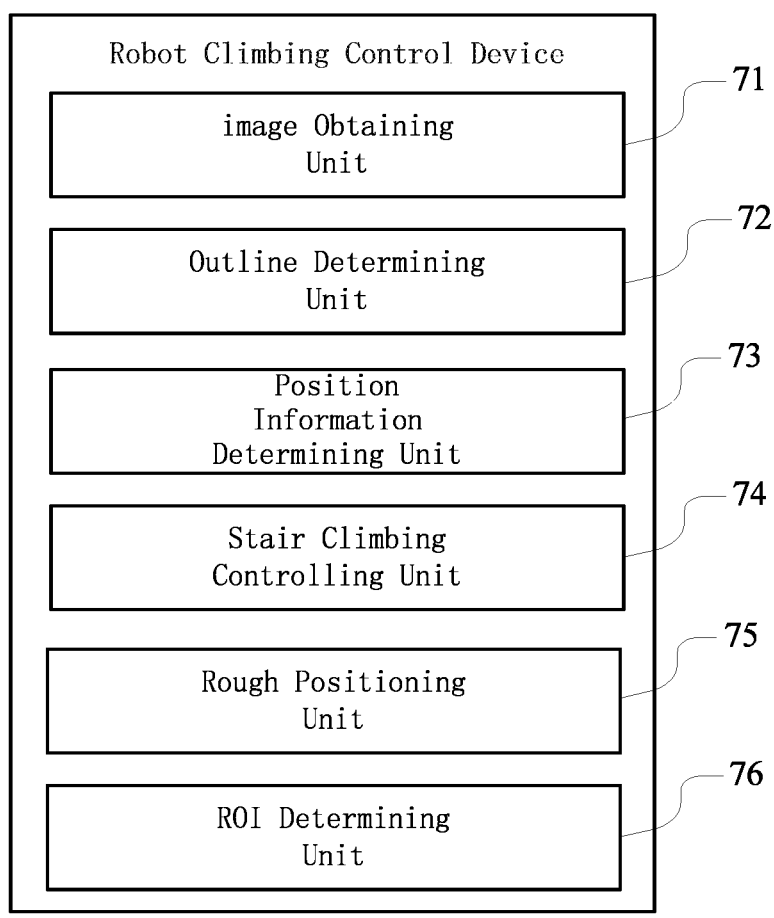
FIG. 7c is a block diagram of functional blocks of a robot climbing control device in accordance with another embodiment of the present disclosure.

Optionally, as shown in FIG. 7c, the robot climbing control device further comprises:

A rough positioning unit 75, configured to locate the stairs in the RGB color image using a preset positioning algorithm.

An ROI determining unit 76, configured to determine an area of the RGB color image where the stairs are resided as a region of interest according to the positioning result of the stairs.

Figure 7D:
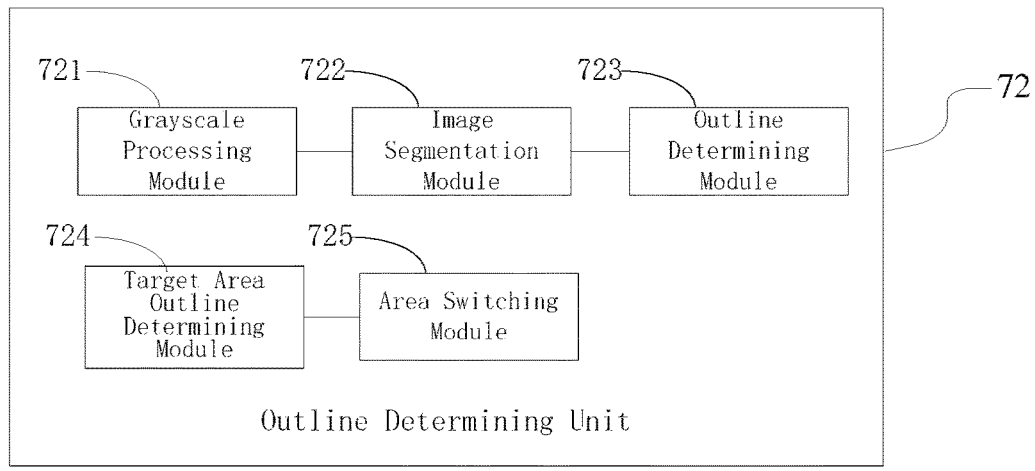
FIG. 7d is a block diagram of functional blocks of an outline determining unit in accordance with another embodiment of the present disclosure.

As shown in FIG. 7d, the outline determining unit 72 further comprises:

A target object outline determining module 724, configured to extract an outline corresponding to a preset outline condition from the region of interest and determine the extracted outline as the outline of the target object on the target step on the stairs.

An area switching module 725, configured to, if the outline of the target object corresponding to the preset outline condition is not extracted from the region of interest, switch the region of interest to the entire RGB color image.

Figure 7E:
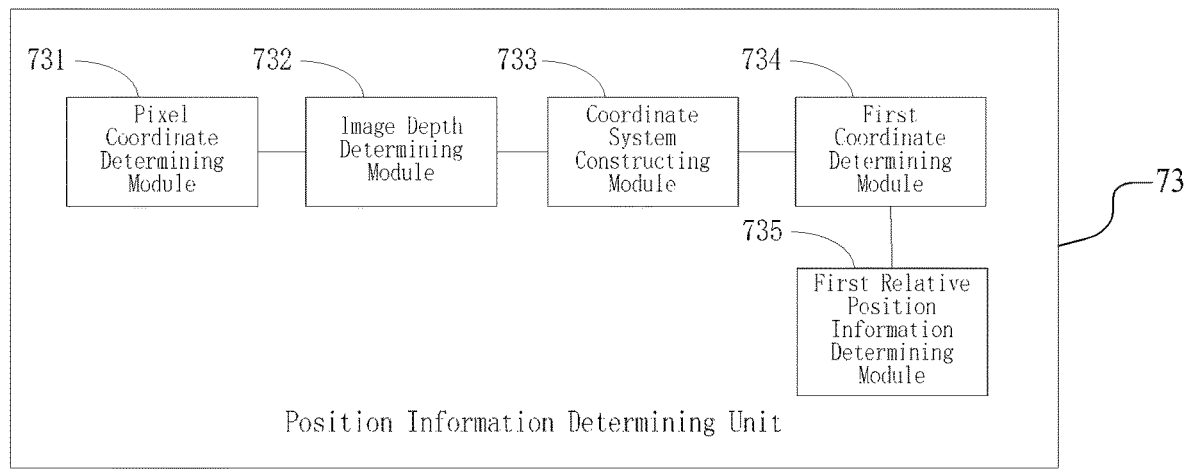
FIG. 7e is a block diagram of functional blocks of a position information determining unit in accordance with an embodiment of the present disclosure.

Optionally, a camera is mounted on the waist of the robot. The position information includes the height and distance of the robot relative to the target step. As shown in FIG. 7e, the position information determining unit 73 further comprises:

A pixel coordinate determining module 731, configured to acquire pixel coordinates of a certain point of the outline of the target object in the RGB image.

An image depth determining module 732, configured to determine an image depth of the target step in the RGB color image according to the depth image.

A coordinate system constructing module 733, configured to construct a first coordinate system and a second coordinate system, wherein the first coordinate system is a three-dimensional coordinate system constructed on a plane where the target object on the target step is located, and the second coordinate system is a three-dimensional coordinate system constructed based on an origin of a camera of the robot.

A first coordinate determining module 734, configured to determine a first coordinate of the robot in the first coordinate system according to the pixel coordinates of the certain point of the outline of the target object, the image depth and the second coordinate system.

A first relative position information determining module 735, configured to determine the height and distance of the robot relative to the target step according to the first coordinate.

Figure 7F:
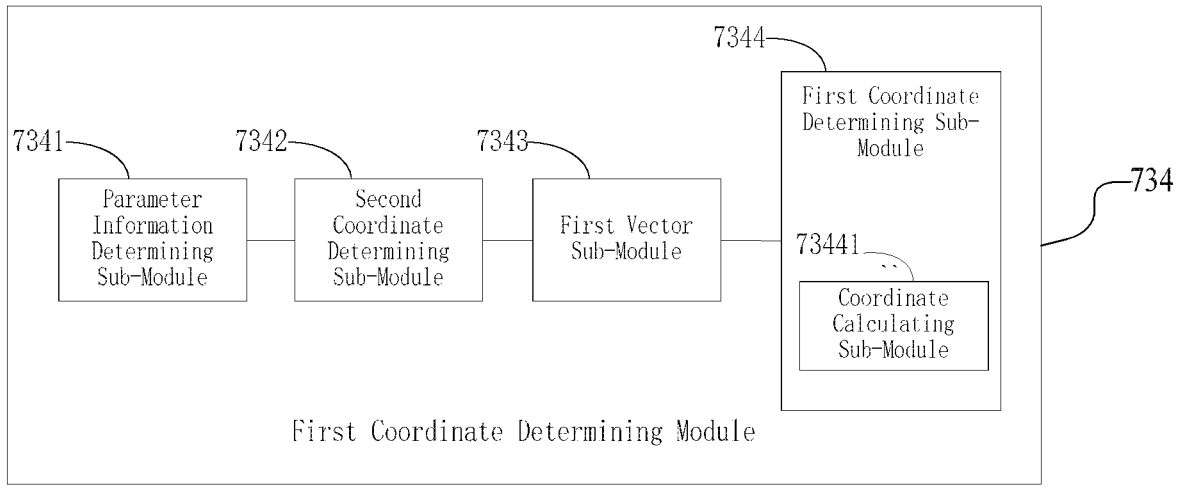
FIG. 7f is a block diagram of functional blocks of a first coordinate determining module in accordance with an embodiment of the present disclosure.

Optionally, as shown in FIG. 7f, the first coordinate determining module 734 specifically comprises:

A parameter information determining sub-module 7341, configured to acquire internal parameter information of the camera of the robot.

A second coordinate determining sub-module 7342, configured to determine a second coordinate of the certain point of the outline of the target object in the second coordinate system according to the pixel coordinates of the certain point of the outline of the target object, the internal parameter information of the camera and the image depth.

A first vector sub-module 7343, configured to acquire a first direction vector and a first normal vector of the outline of the target object in the second coordinate system.

A first coordinate determining sub-module 7344, configured to determine that the robot is located in the first coordinate in the first coordinate system according to the first direction vector, the first normal vector and the second coordinate.

Optionally, the first coordinate determining sub-module 7344 specifically comprises:

A coordinate calculating sub-module 73441, configured to determine the first coordinate $O_1(x, y, z)$ of the robot in the first coordinate system according to the following formula:

$$x = \frac{l \cdot O_1'}{l}, z = \frac{n \cdot O_1'}{\|n\|}, y = \sqrt{O_1'^2 - x^2 - z^2} \; ;$$

wherein x is the coordinate axis in a first direction in the first coordinate system, y is the coordinate axis in a second direction in the first coordinate system, z is the coordinate axis in a third direction in the first coordinate system, $O_1'$ is the second coordinate of the certain point of the outline of the target object in the second coordinate system, I is the first direction vector of the outline of the target object in the second coordinate system, and n is the first normal vector of the outline of the target object in the second coordinate system.

Figure 7G:
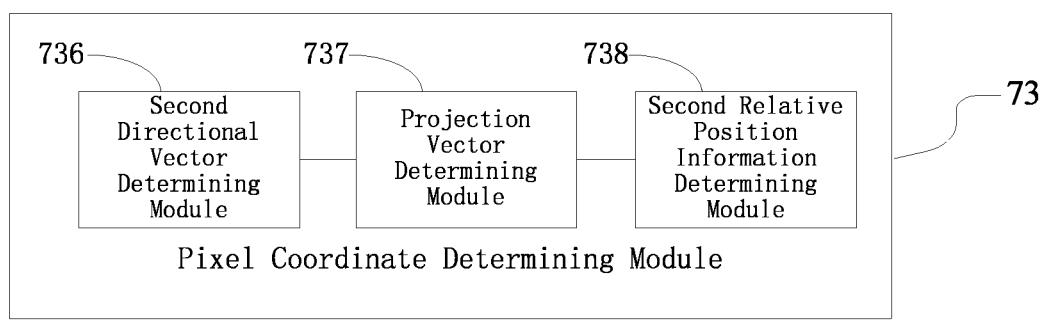
FIG. 7g is a block diagram of functional blocks of the position information determining unit in accordance with an embodiment of the present disclosure.

Optionally, as shown in FIG. 7g, the position information determining unit 73 comprises:

A second directional vector determining module 736, configured to acquire a second direction vector, in the second coordinate system, of the coordinate axis in a first direction in the second coordinate system.

A projection vector determining module 737, configured to acquire a projection vector of a coordinate axis in the first direction in the second coordinate system on a plane where the target object in the first coordinate system is located.

A second relative position information determining module 738, configured to determine the relative included angle between the robot and the target step according to an included angle between the first direction vector and the projection vector.

In an embodiment of the present disclosure, an RGB color image and a depth image of stairs are obtained, an outline of a target object on a target step on the stairs is extracted from the RGB color image, relative position information of the robot and the target step is determined according to the depth image and the outline of the target object, and the robot is controlled to climb the target step according to the relative position information. The embodiment of the present disclosure allows the robot to effectively adjust postures and forward directions on any size of and non-standardized stairs and avoids the deviation of the walking direction, thereby improving the effectiveness and safety of the stair climbing of the robot.

It should be noted that the information exchange and execution processes among the above-mentioned devices/units are based on the same concept as the embodiments of the method of this application. The specific functions and technical effects of the present disclosure can be found in the embodiments of the methods, which is not repeated here.

An embodiment of the present disclosure also provides a computer-readable storage medium. The computer-readable storage medium stores computer-readable instructions. When the computer-readable instructions are executed by a processor, the steps of any one of the robot climbing control methods shown in FIGS. 1 to 6 are implemented.

An embodiment of the present disclosure also provides a robot including a memory, a processor, and computer-readable instructions stored in the memory and capable of running on the processor. The processor executes the computer-readable instructions to implement the steps of any one of the robot climbing control methods shown in FIGS. 1 to 6.

The embodiment of the present disclosure also provides a computer program product. When the computer program product runs on a server, the server executes the steps implementing any one of the robot climbing control methods shown in FIGS. 1 to 6.

Figure 8:
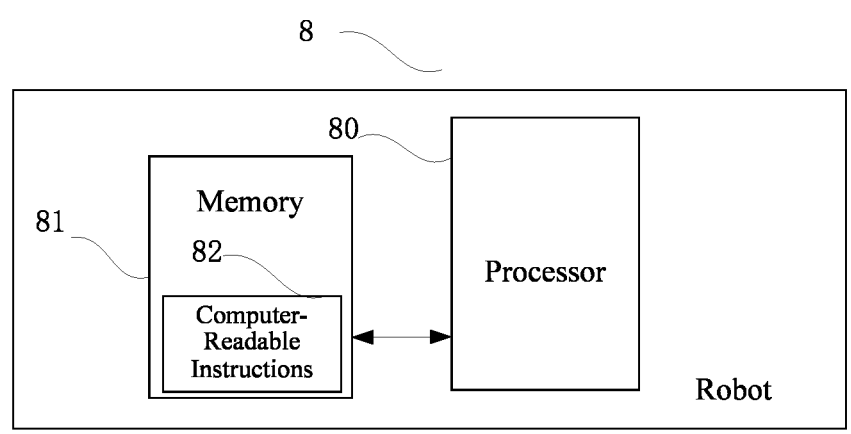
FIG. 8 is a block diagram of the hardware architecture of the robot in accordance with an embodiment of the present disclosure.

FIG. 8 is a block diagram of the hardware architecture of the robot in accordance with an embodiment of the present disclosure. As shown in FIG. 8, the robot 8 in this embodiment includes: a processor 80, a memory 81, and computer-readable instructions 82 stored in the memory 81 and executable on the processor 80. When the processor 80 executes the computer-readable instruction 82, the steps in the above-mentioned embodiments of the robot climbing control methods for each robot are implemented, such as steps S101 to S104 shown in FIG. 1. Alternatively, when the processor 80 executes the computer-readable instructions 82, the functions of the modules/units in the foregoing device embodiments, for example, the functions of the units 71 to 74 shown in FIG. 7, are implemented.

Exemplarily, the computer-readable instruction 82 may be divided into one or more modules/units, and the one or more modules/units are stored in the memory 81 and executed by the processor 80 to complete this application. The one or more modules/units may be a series of computer-readable instruction segments capable of completing specific functions, and the instruction segments are used to describe the execution process of the computer-readable instructions 82 in the robot 8.

The robot 8 may be an intelligent robot. The robot 8 may include, but is not limited to, a processor 80 and a memory 81. Those skilled in the art can understand that FIG. 8 is only an example of the robot 8 and does not constitute a limitation on the robot 8. It may include more or less parts than the parts shown in the figures, or combine some parts, or include different parts. For example, the robot 8 may also include input and output devices, network access devices, buses and the like.

The processor 80 may be a central processing unit (CPU), or another general-purpose processor, an universal processor, a digital signal processor (DSP), an application specific integrated circuit (ASIC), a field-programmable gate array (FPGA), a programmable logic device, a discrete gate or transistor logic, or a discrete hardware component. The universal processor may be a microprocessor or a conventional processor.

The memory 81 may be an internal storage unit of the robot 8, such as a hard disk or a memory of the robot 8. The memory 81 may also be an external storage device of the robot 8, such as a plug-in hard disk equipped on the robot 8, a smart memory card (Smart Media Card, SMC), a Secure Digital (SD) card, a Flash Card, etc. Further, the memory 81 may also include both an internal storage unit of the robot 8 and an external storage device. The memory 81 is used to store the computer readable instructions and other programs and data required by the robot. The memory 81 can also be used to temporarily store data that has been output or will be output.

It should be noted that the information exchange and execution processes among the above-mentioned devices/ units are based on the same concept as the embodiments of the method of this application. The specific functions and technical effects of the present disclosure can be found in the embodiments of the methods, which is not repeated here.

The person skilled in the art may clearly understand that for the convenience and simplicity of the description, the function units and the units described in above are merely examples. Practically, the functions may be accomplished by different function units or units. That is, the internal structure of the device may include different function units or units to accomplish the total or partial functions described in above. Each of the functional units in the various embodiments of the present invention may be integrated into one processing unit. Each of the units may be physically present, or two or more units may be integrated into one unit. The above-mentioned integrated unit can be implemented either in the form of hardware or in the form of computer programs functional units. In addition, the name of each of the function units and the units is merely for the convenience of distinguishing one and the other, and may not limit the claim scope of the present disclosure. The operational process of the units within the system may refer to the process of the embodiment of the method, and may not be described again.

The person skilled in the art may notice that the steps and the units described in the present disclosure may be achieved by the electronic components or the combination of the computer programs and the electronic components. The detailed specification may determine whether the functions are achieved by the electronic components or the computer programs. The person skilled in the art may adopt different ways, which does not beyond the scope of the present disclosure, to achieve each of the specific applications.

In addition, each of the functional units in the various embodiments of the present invention may be integrated into one processing unit. Each of the units may be physically present, or two or more units may be integrated into one unit. The above-mentioned integrated unit can be implemented either in the form of hardware or in the form of software functional units.

The integrated units in the above-described other embodiments may be stored in a computer-readable storage medium when being implemented in the form of software functional units and are sold or used as stand-alone products. Based on this understanding, the technical solution of the present disclosure, either essentially or in part, contributes to the prior art, or all or part of the technical solution may be embodied in the form of a software product stored in a storage medium. In an example, the computer-readable storage medium includes a number of instructions for enabling a computer device (which may be a personal computer, a server, a network device, etc.) or a processor to perform all or part of the steps of the methods described in the various embodiments of the present disclosure. The aforementioned storage medium includes a variety of media such as a USB disk, a mobile hard disk, a read-only memory (ROM), a random access memory (RAM), a magnetic disk, an optical disk, carrier signals, electronic signals, the software distribution medium, and so on. It is noted that the content of the computer-readable storage medium may be increased or decreased according to the jurisdictions and the practice. For example, the computer-readable storage medium may not include the carrier signals and the transmission signals in some jurisdictions.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A robot climbing control method for a legged robot to climb stairs, comprising:
   obtaining an RGB color image and a depth image of the stairs by an RGBD camera;
   extracting an outline of a target object on a target step on the stairs from the RGB color image;
   determining relative position information of the robot and the target step according to the depth image and the outline of the target object, wherein the relative position information of the robot and the target step are transferred from a first coordinate system of the camera to a second coordinate system of the target step, according to a first normal vector and a first direction vector of the target object under the first coordinate system of the camera; and
   controlling the robot to climb the target step according to the relative position information;
   wherein the step of extracting the outline of the target object on the target step on the stairs from the RGB color image further comprises:
   performing grayscale processing on the RGB color image to obtain a grayscale image of the RGB color image;
   acquiring a binarized image of the grayscale image; and
   recognizing outlines of the binarized image, and determining an outline corresponding to preset outline conditions among the recognized outlines as the outline of the target object on the target step on the stairs; and
   wherein the step of recognizing the outlines of the binarized image, and determining the outline corresponding to the preset outline conditions among the recognized outlines as the outline of the target object on the target step on the stairs further comprises:
   recognizing outlines in the binarized image, and obtaining a first outline set according to the recognized outlines;
   determining outline similarity between the outlines in the first outline set and the outline of a preset target object;
   storing outlines whose outline similarity reaches a preset similarity threshold in a second outline set;
   acquiring distances between the outlines in the second outline set and a bottom edge of the RGB color image; and
   determining the outline with the smallest distance as the outline of the target object on the target step.

2. The method according to claim 1, before the step of extracting the outline of the target object on the target step on the stairs from the RGB color image, further comprising:
   locating the stairs in the RGB color image using a preset positioning algorithm;
   determining an area of the RGB color image where the stairs are resided as a region of interest according to the positioning result of the stairs;
   wherein the step of extracting the outline of the target object on the target step on the stairs from the RGB color image further comprises:
   extracting an outline corresponding to a preset outline condition from the region of interest and determining the extracted outline as the outline of the target object on the target step on the stairs; and if the outline of the target object corresponding to the preset outline condition is not extracted from the region of interest, switching the region of interest to the entire RGB color image.

3. The method according to claim 1, wherein the relative position information comprises a height and a distance of the robot relative to the target step, the step of determining the relative position information of the robot and the target step according to the depth image and the outline of the target object further comprises:
acquiring pixel coordinates of a certain point of the outline of the target object in the RGB image;
determining an image depth of the target step in the RGB color image according to the depth image;
constructing the first coordinate system and the second coordinate system, wherein the first coordinate system is a three-dimensional coordinate system constructed on a plane where the target object on the target step is located, and the second coordinate system is a three-dimensional coordinate system constructed based on an origin of the camera of the robot;
determining a first coordinate of the robot in the first coordinate system according to the pixel coordinates of the certain point of the outline of the target object, the image depth and the second coordinate system; and
determining the height and the distance of the robot relative to the target step according to the first coordinate.

4. The method according to claim 3, wherein the step of determining a first coordinate of the robot in the first coordinate system according to the pixel coordinates of the certain point of the outline of the target object, the image depth and the second coordinate system further comprises:
acquiring internal parameter information of the camera of the robot;
determining a second coordinate of the certain point of the outline of the target object in the second coordinate system according to the pixel coordinates of the certain point of the outline of the target object, internal parameter information of the camera and the image depth;
acquiring the first direction vector and the first normal vector of the outline of the target object in the second coordinate system; and
determining the first coordinate of the robot in the first coordinate system according to the first direction vector, the first normal vector and the second coordinate.

5. The method according to claim 4, wherein the step of determining that the robot is located in the first coordinate in the first coordinate system according to the first direction vector, the first normal vector and the second coordinate further comprises:
determining the first coordinate $O_1(x, y, z)$ of the robot in the first coordinate system according to the following formula:

$$x = \frac{l \cdot O_1'}{l}, z = \frac{n \cdot O_1'}{\|n\|}, y = \sqrt{O_1'^2 - x^2 - z^2} \;;$$

wherein x is the coordinate axis in a first direction in the first coordinate system, y is the coordinate axis in a second direction in the first coordinate system, z is the coordinate axis in a third direction in the first coordinate system, $O_1$ is the second coordinate of the certain point of the outline of the target object in the second coordinate system, l is the first direction vector of the outline of the target object in the second coordinate system, and n is the first normal vector of the outline of the target object in the second coordinate system.

6. The method according to claim 3, wherein the relative position information comprises a relative included angle between the robot and the target step, and the step of determining the relative position information of the robot and the target step according to the depth image and the outline of the target object further comprises:
acquiring a second direction vector, in the second coordinate system, of the coordinate axis in a first direction in the second coordinate system;
acquiring a projection vector of a coordinate axis in the first direction in the second coordinate system on a plane where the target object in the first coordinate system is located; and
determining the relative included angle between the robot and the target step according to an included angle between the first direction vector and the projection vector.

7. The method according to claim 1, wherein the target object on the target step is an anti-skid belt on the target step.

8. A robot climbing control system, comprising at least one processor configured to:
obtain an RGB color image and a depth image of stairs;
extract an outline of a target object on a target step on the stairs from the RGB color image;
determine relative position information of the robot and the target step according to the depth image and the outline of the target object; and
control the robot to climb the target step according to the relative position information;
wherein the at least one processor is further configured to:
locate the stairs in the RGB color image using a preset positioning algorithm;
determine an area of the RGB color image where the stairs are resided as a region of interest according to the positioning result of the stairs;
extract an outline corresponding to a preset outline condition from the region of interest and determine the extracted outline as the outline of the target object on the target step on the stairs; and
if the outline of the target object corresponding to the preset outline condition is not extracted from the region of interest, switch the region of interest to the entire RGB color image.

9. The system according to claim 8, wherein the at least one processor is further configured to:
perform grayscale processing on the RGB color image to obtain a grayscale image of the RGB color image;
acquire a binarized image of the grayscale image; and
recognize outlines of the binarized image, and determine an outline corresponding to preset outline conditions among the recognized outlines as the outline of the target object on the target step on the stairs.

10. The system according to claim 9, wherein the at least one processor is further configured to:
recognize outlines in the binarized image, and obtaining a first outline set according to the recognized outlines;
determine outline similarity between the outlines in the first outline set and the outline of a preset target object;
store outlines whose outline similarity reaches a preset similarity threshold in a second outline set;
acquire distances of between the outlines in the second outline set and a bottom edge of the RGB color image; and determine the outline with the smallest distance as the outline of the target object on the target step.

11. The system according to claim 8, wherein the relative position information comprises a height and a distance of the robot relative to the target step, the at least one processor is further configured to:
acquire pixel coordinates of a certain point of the outline of the target object in the RGB image;
determine an image depth of the target step in the RGB color image according to the depth image;
construct a first coordinate system and a second coordinate system, wherein the first coordinate system is a three-dimensional coordinate system constructed on a plane where the target object on the target step is located, and the second coordinate system is a three-dimensional coordinate system constructed based on an origin of a camera of the robot;
determine a first coordinate of the robot in the first coordinate system according to the pixel coordinates of the certain point of the outline of the target object, the image depth and the second coordinate system; and
determine the height and the distance of the robot relative to the target step according to the first coordinate.

12. The system according to claim 11, wherein the at least one processor is further configured to:
acquire internal parameter information of the camera of the robot;
determine a second coordinate of the certain point of the outline of the target object in the second coordinate system according to the pixel coordinates of the certain point of the outline of the target object, the internal parameter information of the camera and the image depth;
acquire a first direction vector and a first normal vector of the outline of the target object in the second coordinate system; and
determine that the robot is located in the first coordinate in the first coordinate system according to the first direction vector, the first normal vector and the second coordinate.

13. The system according to claim 12, wherein the at least one processor is further configured to:
determine the first coordinate $O_1(x, y, z)$ of the robot in the first coordinate system according to the following formula:

$$x = \frac{l \cdot O_1'}{l}, z = \frac{n \cdot O_1'}{\|n\|}, y = \sqrt{O_1'^2 - x^2 - z^2};$$

wherein x is the coordinate axis in a first direction in the first coordinate system, y is the coordinate axis in a second direction in the first coordinate system, z is the coordinate axis in a third direction in the first coordinate system, $O_1$ is the second coordinate of the certain point of the outline of the target object in the second coordinate system, I is the first direction vector of the outline of the target object in the second coordinate system, and n is the first normal vector of the outline of the target object in the second coordinate system.

14. The system according to claim 11, wherein the relative position information comprises a relative included angle between the robot and the target step, the at least one processor is further configured to:

acquire a second direction vector, in the second coordinate system, of the coordinate axis in a first direction in the second coordinate system;
acquire a projection vector of a coordinate axis in the first direction in the second coordinate system on a plane where the target object in the first coordinate system is located; and
determine the relative included angle between the robot and the target step according to an included angle between the first direction vector and the projection vector.

15. A non-transitory computer-readable medium having stored thereon computer instructions, when executed by at least one processor, perform a robot climbing control method, the method comprising:
obtaining an RGB color image and a depth image of the stairs by an RGBD camera;
extracting an outline of a target object on a target step on the stairs from the RGB color image;
determining relative position information of the robot and the target step according to the depth image and the outline of the target object, wherein the relative position information of the robot and the target step are transferred from a first coordinate system of the camera to a second coordinate system of the target step, according to a first normal vector and a first direction vector of the target object under the first coordinate system of the camera; and
controlling the robot to climb the target step according to the relative position information;
wherein the relative position information comprises a height and a distance of the robot relative to the target step, the step of determining the relative position information of the robot and the target step according to the depth image and the outline of the target object further comprises:
acquiring pixel coordinates of a certain point of the outline of the target object in the RGB image;
determining an image depth of the target step in the RGB color image according to the depth image;
constructing the first coordinate system and the second coordinate system, wherein the first coordinate system is a three-dimensional coordinate system constructed on a plane where the target object on the target step is located, and the second coordinate system is a three-dimensional coordinate system constructed based on an origin of the camera of the robot;
determining a first coordinate of the robot in the first coordinate system according to the pixel coordinates of the certain point of the outline of the target object, the image depth and the second coordinate system; and
determining the height and the distance of the robot relative to the target step according to the first coordinate.

16. The non-transitory computer-readable medium according to claim 15, wherein the step of extracting the outline of the target object on the target step on the stairs from the RGB color image further comprises:
performing grayscale processing on the RGB color image to obtain a grayscale image of the RGB color image;
acquiring a binarized image of the grayscale image; and
recognizing outlines of the binarized image, and determining an outline corresponding to preset outline conditions among the recognized outlines as the outline of the target object on the target step on the stairs.

17. The non-transitory computer-readable medium according to claim 16, wherein the step of recognizing the outlines of the binarized image, and determining the outline corresponding to the preset outline conditions among the recognized outlines as the outline of the target object on the target step on the stairs further comprises:

recognizing outlines in the binarized image, and obtaining a first outline set according to the recognized outlines;

determining outline similarity between the outlines in the first outline set and the outline of a preset target object;

storing outlines whose outline similarity reaches a preset similarity threshold in a second outline set;

acquiring distances between the outlines in the second outline set and a bottom edge of the RGB color image; and determining the outline with the smallest distance as the outline of the target object on the target step.

18. The non-transitory computer-readable medium according to claim 15, wherein before the step of extracting the outline of the target object on the target step on the stairs from the RGB color image, further comprising:

locating the stairs in the RGB color image using a preset positioning algorithm; and determining an area of the RGB color image where the stairs are resided as a region of interest according to the positioning result of the stairs;

wherein the step of extracting the outline of the target object on the target step on the stairs from the RGB color image further comprises:

extracting an outline corresponding to a preset outline condition from the region of interest and determining the extracted outline as the outline of the target object on the target step on the stairs; and if the outline of the target object corresponding to the preset outline condition is not extracted from the region of interest, switching the region of interest to the entire RGB color image.

19. The non-transitory computer-readable medium according to claim 15, wherein the step of determining a first coordinate of the robot in the first coordinate system according to the pixel coordinates of the certain point of the outline of the target object, the image depth and the second coordinate system further comprises:

acquiring internal parameter information of the camera of the robot;

determining a second coordinate of the certain point of the outline of the target object in the second coordinate system according to the pixel coordinates of the certain point of the outline of the target object, internal parameter information of the camera and the image depth;

acquiring the first direction vector and the first normal vector of the outline of the target object in the second coordinate system; and determining the first coordinate of the robot in the first coordinate system according to the first direction vector, the first normal vector and the second coordinate.

20. The non-transitory computer-readable medium according to claim 15, wherein the relative position information comprises a relative included angle between the robot and the target step, and the step of determining the relative position information of the robot and the target step according to the depth image and the outline of the target object further comprises:

acquiring a second direction vector, in the second coordinate system, of the coordinate axis in a first direction in the second coordinate system;

acquiring a projection vector of a coordinate axis in the first direction in the second coordinate system on a plane where the target object in the first coordinate system is located; and determining the relative included angle between the robot and the target step according to an included angle between the first direction vector and the projection vector.

* * * * *